United States Patent [19]

Mayr

[11] Patent Number: 5,791,846

[45] Date of Patent: Aug. 11, 1998

[54] EXPANSION DOWEL

[75] Inventor: Franz-Paul Mayr, Hechenwang, Germany

[73] Assignee: Hilti Aktiengesellschaft, Schaan, Liechtenstein

[21] Appl. No.: 864,775

[22] Filed: May 29, 1997

Related U.S. Application Data

[63] Continuation of Ser. No. 590,250, Jan. 23, 1996, abandoned.

[30] Foreign Application Priority Data

Jan. 23, 1995 [DE] Germany .......... 195 01 911.3

[51] Int. Cl.⁶ .................................. F16B 13/04
[52] U.S. Cl. .................. 411/60; 411/60; 411/55; 411/57; 411/71
[58] Field of Search .................. 411/62, 71, 72, 411/55, 60, 57

[56] References Cited

U.S. PATENT DOCUMENTS

| | | | |
|---|---|---|---|
| 1,000,715 | 8/1911 | Caywood | 411/60 |
| 1,248,004 | 11/1917 | Pleister | 411/60 |
| 1,248,008 | 11/1917 | Pleister | 411/60 |
| 1,288,177 | 12/1918 | Pleister | 411/60 |
| 3,808,938 | 5/1974 | Chromy . | |
| 4,235,151 | 11/1980 | Udert et al. | 411/60 |
| 4,711,232 | 12/1987 | Fischer et al. | 411/71 |
| 4,893,973 | 1/1990 | Herb | 411/55 |
| 5,224,805 | 7/1993 | Moretti et al. | 411/60 |
| 5,496,006 | 3/1996 | Kulka et al. | 411/60 |

FOREIGN PATENT DOCUMENTS

| | | | |
|---|---|---|---|
| 236042 | 10/1961 | Australia | 411/71 |
| 2538927 | 3/1977 | Germany . | |
| 2818254 | 10/1979 | Germany | 411/71 |
| 4317492 | 12/1994 | Germany . | |

*Primary Examiner*—Kenneth J. Dorner
*Assistant Examiner*—Fredrick Conley
*Attorney, Agent, or Firm*—Anderson, Kill & Olick, P.C.

[57] ABSTRACT

An expansion dowel (1) includes an axially extending cylindrical sleeve (2) and an expanding body (3). The sleeve (2) has an axially extending bore (5) and an axially extending expansion section (6) with axially extending slits. The bore (5) tapers inwardly to the leading end of the sleeve in the expansion section (6). The expanding body (3) is received in and expands the expansion section (6). Circumferentially and axially extending approximately V-shaped grooves 9 are formed in the outside surface of the expansion section and/are spaced apart by circumferentially and axially extending cylindrical surface sections (8). The approximately v-shaped grooves have flanks defining an angle ($\alpha$) in the range of approximately 120° to 140°.

6 Claims, 1 Drawing Sheet

5,791,846

1

EXPANSION DOWEL

This is a continuation application of Ser. No. 08/590,250, filed Jan. 23, 1996, now abandoned.

BACKGROUND OF THE INVENTION

The present invention is directed to an expansion dowel comprising a axially extending cylindrical sleeve having an expansion section extending axially from a leading end and containing axially extending slits. The sleeve forms an axially extending bore tapering inwardly in the expansion section towards the leading end. Further, the expansion section has circumferentially and axially extending approximately V-shaped grooves.

Expansion dowels of this general type have a bore tapering in a cylindrically-shaped manner in the driving direction in the expansion section of the sleeve. When the dowel is widened, a high radial pressure is exerted upon the receiving material forming the borehole into which the expansion dowel is inserted. The extraction resistance of the expansion dowel is essentially a consequence of the frictional lock of the expansion section of the sleeve pressed outwardly against the receiving material, usually concrete.

In U.S. Pat. No. 3,808,938, it is proposed to use fine circumferentially extending grooves in the expansion section of the sleeve to improve the extraction resistance values. The tooth-like grooves, with approximately v-shaped profiles, are intended to dig into the receiving material when the expansion section is expanded or widened. Accordingly, the frictional lock is to be assisted by a positive lock with the extraction resistance values being increased. However, the tooth-like fine grooves are frequently damaged when the sleeve is driven into the receiving material and the webs between the grooves, tapering to a point, are deformed by the high contact pressure in the expansion section. This action prevents an adequate positive lock to be achieved, and the extraction resistance values do not reach the desired value. Another disadvantage of the tooth-like grooves is that the pointed webs forced outwardly against the receiving materials can tear and pulverize such material, so that an adequate friction lock cannot be attained and the extraction resistance values become less as compared to expansion dowels without grooves.

As a result, DE-A-25 56 019 was developed to provide shallow circumferentially extending grooves in the expansion section of the sleeve, so that the surface of the expansion section is free of notches. This design of the sleeve along with the specific shaping of the sleeve bore and the expanding body were intended to improve the extraction values as compared to the then known solutions. The smooth surface of the groove or recess was meant to prevent any damage to the receiving material. The shaping of the recess, free of any notches, was furthermore intended to prevent buckling, bending and fracture of the sleeve in the region of the recesses. In cracked concrete the extraction values of these expansion dowels can no longer attain the required minimum extraction values. It is also possible that a complete failure of the anchorage can occur. For safety reasons such expansion dowels, according to the state of the art, are not to be set into the tension zones of concrete receiving material.

Therefore, it has been attempted to improve the expansion dowels of this general type, so that a higher extraction value can be attained and, in particular, to attain the desired extraction values in cracked concrete. It is intended to improve the expansion dowel so that it can be set in the tension zone of concrete receiving material without any problems. Accordingly, the inherent stability of the sleeve is to be retained and, in particular, no undesired deformation or receiving material failure is to be allowed in the expansion section.

SUMMARY OF THE INVENTION

Therefore, the primary object of the present invention is to provide an expansion dowel affording the above improvements by providing circumferentially and axially extending cylindrical surface sections between the v-shaped grooves and the outside surface of the expansion section. Surprisingly, it was found that an expansion dowel having a cylindrically-shaped sleeve with an expansion section extending from its leading end containing axially extending slits and with a bore through the sleeve tapering conically inwardly in the expansion region to the leading end was effective. The bore is arranged to receive an expanding body for expanding the expansion section. The outside surface of the expansion section has circumferentially and axially extending grooves of approximately v-shaped configuration with circumferentially and axially extending cylindrical surface sections spacing the grooves apart. The flanks forming each groove define an angle in the range of approximately 120° degrees to 140°. Such an expansion dowel affords the desired improvements and, in particular, affords the requisite safety in cracked concrete. While the grooves have a v-shaped contour, it is assured by the obtuse angles formed in accordance with the invention that the sleeve does not buckle, bend or fracture in the expansion section.

It has proved to be advantageous if the sleeve has at least two circumferentially extending grooves in the expansion section and if the number of circumferentially extending cylindrical surface sections corresponds to the number of grooves.

In a preferred embodiment of the invention, the grooves have an axial dimension amounting to approximately 3 to 10 times the axial dimension of the cylindrical surface sections separating the grooves. Especially good extraction values can be achieved with such an arrangement.

The inherent stability of the sleeve and the safety of the receiving material against failure in the expansion section is further assisted by the grooves having a depth corresponding at most to half the wall thickness of the cylindrical sleeve body in its region adjacent the region where the bore tapers inwardly in a conically-shaped manner.

In a preferred form of the expansion dowel embodying the present invention, the depth of the grooves in the expansion section of the sleeve corresponds approximately to the axial dimension of the cylindrical surface sections separating the grooves. As a result, the receiving material in contact with the sleeve in the region of the grooves, while simultaneously relieving the load in the cylindrical surface sections between the grooves, assists in improving the frictional lock while achieving an excellent positive lock. With the usual dimensions of the expansion dowel of the invention, it is advantageous if the expansion section of the cylindrical sleeve comprises four grooves at most. In this way a balanced relationship of frictional lock and positive lock is gained across the expansion section of the sleeve, which can be specially important in the case of cracked concrete.

The various features of novelty which characterize the invention are pointed out with particularity in the claims annexed to and forming a part of this disclosure. For a better understanding of the invention, its operating advantages and specific objects attained by its use, reference should be had

DETAILED DESCRIPTION OF THE INVENTION

Figure 1:
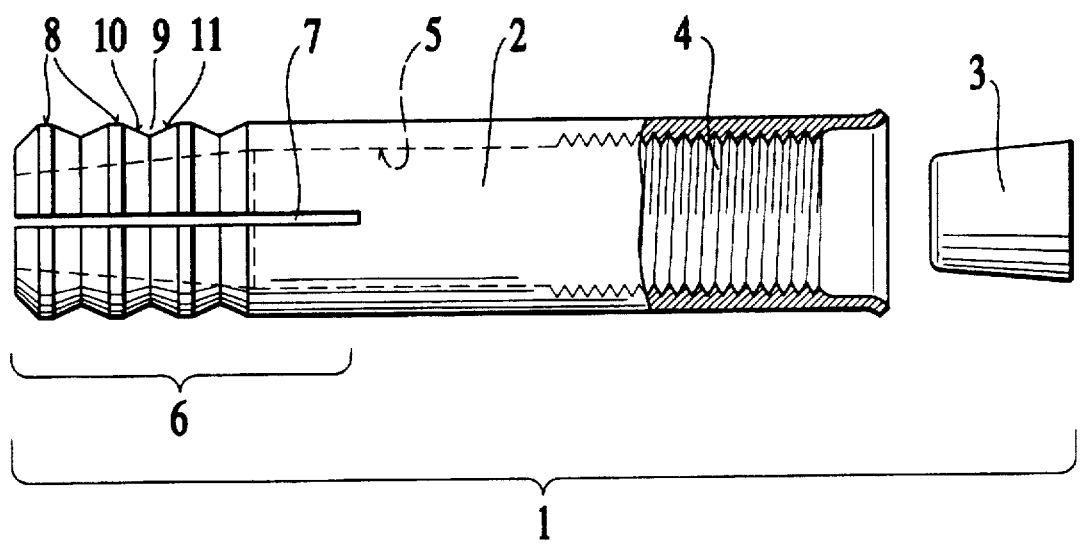
FIG. 1 is an axially extending side view of an expansion dowel embodying the present invention and made up of a sleeve and an expanding member with a portion of the sleeve shown in section.
Figure 2:
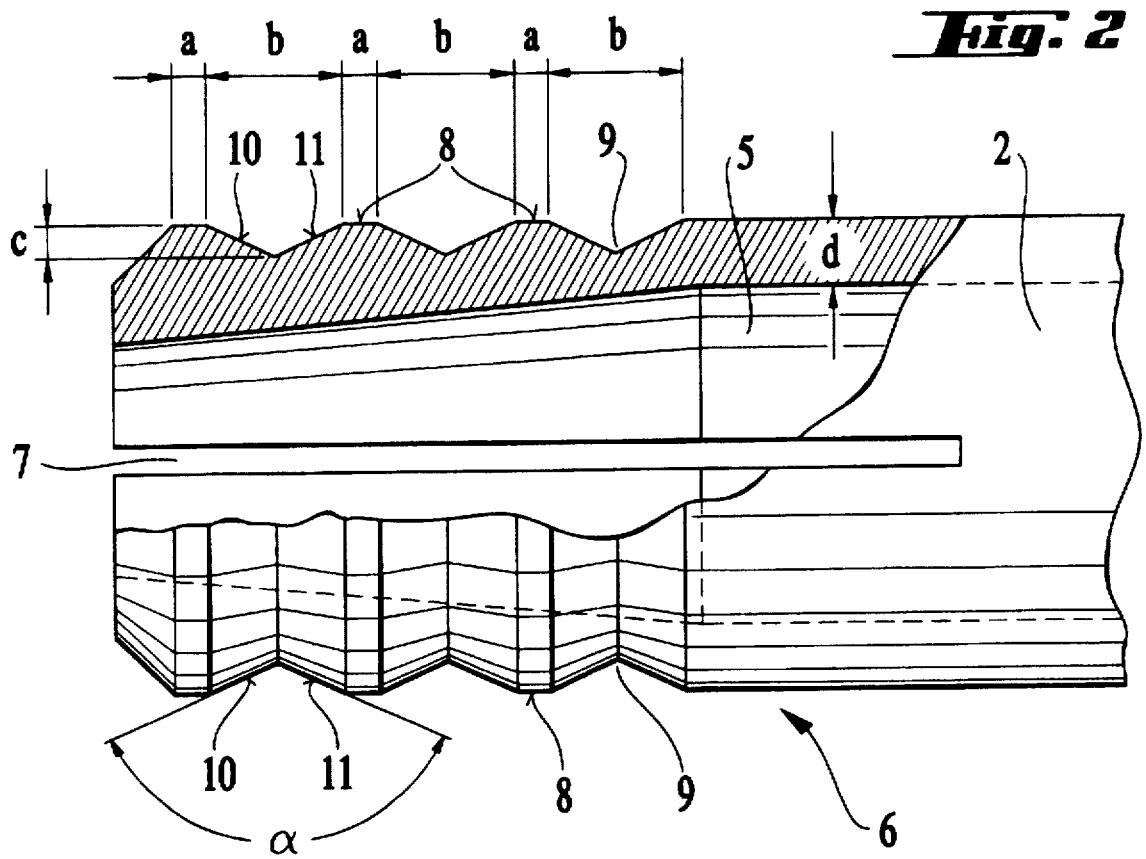
FIG. 2 is an enlarged axially extending view of an expansion section of the sleeve.

An expansion dowel embodying the present invention is shown in FIG. 1 and 2. The expansion dowel is formed of an axially extending sleeve 2 and an expanding member 3. The sleeve 2 has a leading end, the left hand end is viewed in FIGS. 1 and 2, and a trailing end, the right hand end. The leading end region of the sleeve 2 is shaped as an axially extending expansion section 6. The expansion section 6 has axially extending slits 7 and a bore 5 extends through the sleeve from the trailing end to the leading end and, in the expansion section 6, the bore 5 tapers conically inward toward the leading end. The expanding member 3 is shaped to match the conically shaped surface in the expansion section. At the trailing end region of the sleeve 2 the bore has a means 4 for engaging a load. As shown, the load engagement means 4 is shaped as a threaded bore 4, into which an attachment number or anchor can be threaded. The expanding body 3 can be inserted from the exterior through the trailing end and the threaded bore 4 forwardly into the expansion section 6 of the sleeve. The cooperating inside surface of the conically shaped bore 5 and the outside surface of the expanding member 3 are matched with one another, so that the expansion section 6 is uniformly widened when the expanding body 3 is driven into it, whereby a retention of the expansion dowel in the borehole, not shown, is achieved.

To improve the anchorage of the expansion dowel 1 in the borehole, the sleeve 2 is provided with circumferentially and axially extending grooves 9 in the expansion section 6 and the grooves are spaced axially apart by circumferentially and axially extending surface sections 8. Grooves 9 are approximately v-shaped and have flanks 10, 11 defining an angle α of approximately 120° to 140°. The flanks diverge outwardly from a circumferentially extending linear base. The combination of at least two grooves with the v-shaped profile and with a cylindrical surface section 8 between them affords a simple setting of the expansion dowel 1. The cylindrical surface section 8 slides along the borehole wall without damaging the receiving material in which the borehole is formed. When the expanding body 3 is driven into the borehole, the expansion section 6 is widened uniformly and an optimum anchorage within the borehole is obtained. The cylindrically shaped surface sections 8 and the arrangement of the grooves 9 with the v-shaped contour assure that the receiving material cannot be pulverized when the sleeve is widened in the expansion section 6, rather its structure is retained essentially unchanged. The flanks 10, 11 of the grooves 9 are pressed against the surface of the borehole, whereby the surface of the receiving material is deformed based on the arrangement of the cylindrically shaped surface sections 8 and the grooves 9, so that in addition to the friction lock, a positive lock is formed between the borehole surface and the sleeve 2 expanded radially outwardly in the expansion section 6.

In a preferred embodiment, the grooves 9 have a dimension b measured in the axial direction which is approximately 3 to 10 times the axial dimension a of the cylindrical surface sections 8 separating the grooves 9. The depth c of the grooves 9 is dimensioned so that it corresponds at the most to half the wall thickness d of the cylindrical sleeve 2 in the region of the threaded bore 4. In the embodiment illustrated, the depth c of the grooves 9 and the axial dimension a of the cylindrical surface sections 8 has been selected to be approximately equal. The number of the grooves 9 in the expansion section 6 of the sleeve 2 is in the range of at least 2, or 3 as is shown, with a maximum of four grooves, with the same number of cylindrical surface sections 8.

As viewed in the drawing, the first or leading cylindrical surface section 8 is positioned ahead of the first groove 9, that is the groove closest to the leading end of the dowel. The outside surface of the expansion section 6 tapers inwardly from the first surface section 8 to the leading end.

While the expansion dowel of the present invention can be a metal dowel, it can also be formed of a plastics material. The expansion dowel has higher extraction values and achieves the required minimum extraction values in cracked concrete as compared to dowels known in the state of the art. The inherent stability of the sleeve is retained, and undesirable deformations or material failures are prevented in the expansion section due to the specific arrangement of the grooves 9 and the separating cylindrical surface sections 8. The expansion dowel in the present invention can be used in the tension zone of concrete receiving material without neglecting the safety aspects.

While specific embodiments of the invention have been shown and described in detail to illustrate the inventive principles, it will be understood that the invention may be embodied otherwise without departing from such principles.

What is claimed is:

1. Expansion dowel comprising an axially extending cylindrical sleeve (2) having a leading end to be inserted into a borehole and a trailing end with an expansion section (6) extending axially from said leading end toward said trailing end, said expansion section (6) having axially extending slits (7) therein extending parallel to the axis of said sleeve (2), said sleeve (2) having an outside surface an inside surface and a wall thickness (d) between said outside and inside surfaces, with said inside surface forming an axially extending circular bore (5) therein extending from said trailing end towards said leading end and in said expansion section (6) said bore tapers conically inwardly toward said leading end, an expanding body (3) insertable into said bore for expanding said expansion section (6), said expanding body (3) having a smooth unindented axially and circumferentially extending outer surface, said sleeve (2) having circumferentially and axially extending substantially v-shaped grooves (9) in said outside surface of said expansion section (6) and continuous in the circumferential direction, said v-shaped grooves having circumferentially extending flanks (10,11) diverging outwardly from a base spaced inwardly from said outside surface and defined by an intersection of said flanks whereby said base is free of any axial length, circumferentially and axially extending cylindrical surface sections (8) in said outside surface of said sleeve (2) in said expansion region separating said grooves (9) axially apart, said surface sections having an axial dimension (a), and said circumferentially extending flanks (10, 11) of each said groove defining an angle (α) therebetween in the range of approximately 120° to 140°.

2. An expansion dowel, as set forth in claim 1, wherein at least two circumferentially extending grooves (9) are located in said expansion section (8), and the number of the cylindrical surface sections (8) corresponds to the number of the grooves (9).

3. An expansion dowel, as set forth in claim 1 or 2, wherein the dimension of said grooves (9) in the axial direction is in the range of approximately 3 to 10 times the axial dimension (a) of the surface sections (8) separating said grooves.

4. An expansion dowel, as set forth in claim 3, wherein said grooves (9) have a depth (c) radially inwardly from said outside surface corresponding at most to half the wall thickness (d) of an axially extending section of said sleeve (2) extending from said trailing end toward said conically shaped section of said bore (5).

5. An expansion dowel, as set forth in claim 4, wherein the depth (c) of said grooves (9) corresponds approximately to the axial dimension (a) of said cylindrical surface sections (8) separating said grooves (9).

6. An expansion dowel, as set forth in claim 1 or 2, wherein said expansion section (6) of said sleeve (2) having at the most four said grooves (9).

* * * * *